US009466258B2

(12) United States Patent
Ju et al.

(10) Patent No.: US 9,466,258 B2
(45) Date of Patent: Oct. 11, 2016

(54) DATA PROCESSING APPARATUS WITH ADAPTIVE COMPRESSION ALGORITHM SELECTION FOR DATA COMMUNICATION BASED ON SENSOR INPUT/DISPLAY CONFIGURATION OVER DISPLAY INTERFACE AND RELATED DATA PROCESSING METHOD

(71) Applicant: MEDIATEK INC., Hsin-Chu (TW)

(72) Inventors: Chi-Cheng Ju, Hsinchu (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 472 days.

(21) Appl. No.: 13/954,963

(22) Filed: Jul. 30, 2013

(65) Prior Publication Data

US 2014/0098114 A1    Apr. 10, 2014

Related U.S. Application Data

(60) Provisional application No. 61/711,319, filed on Oct. 9, 2012, provisional application No. 61/712,949, filed on Oct. 12, 2012.

(51) Int. Cl.
*G09G 5/00* (2006.01)
*G06T 1/20* (2006.01)
(Continued)

(52) U.S. Cl.
CPC ............... *G09G 5/006* (2013.01); *G06T 1/20* (2013.01); *G06T 9/00* (2013.01); *G09G 5/005* (2013.01);
(Continued)

(58) Field of Classification Search
CPC ............ G09G 5/00–5/005; G09G 5/363; G09G 5/006; G06F 3/14; G06F 12/023; G06F 3/067; G06F 9/5016; G06F 3/0605; G06F 3/0631; G06T 1/20
See application file for complete search history.

(56) References Cited

U.S. PATENT DOCUMENTS

| 4,424,565 A | 1/1984 | Larson |
| 5,553,160 A | 9/1996 | Dawson |

(Continued)

FOREIGN PATENT DOCUMENTS

| CN | 1359048 A | 7/2002 |
| CN | 1610408 A | 4/2005 |

(Continued)

OTHER PUBLICATIONS

"International Search Report" mailed on Dec. 19, 2013 for International application No. PCT/CN2013/083118, International filing date: Sep. 9, 2013.

(Continued)

*Primary Examiner* — Sath V Perungavoor
*Assistant Examiner* — Howard D Brown, Jr.
(74) *Attorney, Agent, or Firm* — Winston Hsu; Scott Margo

(57) ABSTRACT

A data processing apparatus has a compressor and an output interface. The compressor receives an input display data, and generates an output display data according to the input display data. The output interface packs the output display data into an output bitstream, and outputs the output bitstream via a display interface. The compressor adaptively adjusts a compression algorithm applied to the input display data according to at least one sensor input signal. For example, the at least one sensor input signal is generated from at least one of an ambient light sensor, a proximity sensor, a thermal sensor, an accelerometer, a gyroscope, and a receiver of a global navigation satellite system.

16 Claims, 10 Drawing Sheets

(51) Int. Cl.
*G06T 9/00* (2006.01)
*H04N 19/172* (2014.01)
*H04N 19/12* (2014.01)
*H04N 19/136* (2014.01)
*H04N 19/156* (2014.01)
*H04N 19/164* (2014.01)
*H04N 7/18* (2006.01)

(52) U.S. Cl.
CPC ............ *H04N 19/12* (2014.11); *H04N 19/136* (2014.11); *H04N 19/156* (2014.11); *H04N 19/164* (2014.11); *H04N 19/172* (2014.11); *G09G 2330/021* (2013.01); *G09G 2340/02* (2013.01); *G09G 2350/00* (2013.01); *G09G 2370/10* (2013.01)

(56) References Cited

U.S. PATENT DOCUMENTS

| | | | |
|---|---|---|---|
| 5,760,760 A * | 6/1998 | Helms | G09G 3/36 345/102 |
| 5,943,508 A | 8/1999 | Penney | |
| 6,031,929 A | 2/2000 | Maitz | |
| 6,353,699 B1 | 3/2002 | Schwab | |
| 6,704,022 B1 | 3/2004 | Aleksic | |
| 6,914,637 B1 | 7/2005 | Wolf | |
| 7,822,278 B1 | 10/2010 | Hobbs | |
| 7,903,119 B2 * | 3/2011 | Hochmuth | H04N 1/3333 345/522 |
| 7,930,436 B1 | 4/2011 | Znosko | |
| 8,112,513 B2 | 2/2012 | Margulis | |
| 8,145,813 B2 * | 3/2012 | Ho | G06F 13/4027 345/520 |
| 8,179,971 B1 | 5/2012 | Gough | |
| 8,363,969 B1 | 1/2013 | Wang | |
| 8,599,316 B2 | 12/2013 | Deever | |
| 2002/0030675 A1 * | 3/2002 | Kawai | H04N 13/0014 345/204 |
| 2002/0057265 A1 | 5/2002 | Tamura | |
| 2002/0105905 A1 | 8/2002 | Boyle | |
| 2003/0234799 A1 * | 12/2003 | Lee | G06F 3/1407 345/660 |
| 2004/0103216 A1 | 5/2004 | Lane | |
| 2005/0135682 A1 | 6/2005 | Abrams | |
| 2005/0276496 A1 * | 12/2005 | Molgaard | H04N 19/105 382/244 |
| 2006/0017715 A1 | 1/2006 | Kimura | |
| 2006/0037051 A1 * | 2/2006 | McDowell | H04N 7/18 725/80 |
| 2006/0093230 A1 | 5/2006 | Hochmuth | |
| 2006/0117371 A1 * | 6/2006 | Margulis | H04L 12/2838 725/131 |
| 2006/0159358 A1 * | 7/2006 | Yi | H04N 19/15 382/239 |
| 2006/0215755 A1 * | 9/2006 | Ju | H04N 19/172 375/240.12 |
| 2007/0081587 A1 | 4/2007 | Raveendran | |
| 2007/0255926 A1 * | 11/2007 | Chuang | G06F 17/30233 711/203 |
| 2009/0129478 A1 | 5/2009 | Meroth | |
| 2009/0322713 A1 | 12/2009 | Furihata | |
| 2010/0073574 A1 | 3/2010 | Nakajima | |
| 2010/0158104 A1 * | 6/2010 | Lin | H04N 19/61 375/240.2 |
| 2010/0182402 A1 | 7/2010 | Nakajima | |
| 2010/0328425 A1 * | 12/2010 | Nagaraj | G06T 9/001 348/42 |
| 2011/0075729 A1 | 3/2011 | Dane | |
| 2011/0249723 A1 | 10/2011 | Wasily | |
| 2012/0027317 A1 | 2/2012 | Choi | |
| 2012/0068952 A1 * | 3/2012 | Slaby | G01K 7/02 345/173 |
| 2012/0072044 A1 * | 3/2012 | Slaby | G01K 13/00 700/299 |
| 2012/0072157 A1 * | 3/2012 | Alameh | G01K 13/00 702/99 |
| 2012/0163181 A1 | 6/2012 | Xue | |
| 2012/0207155 A1 | 8/2012 | Nelogal | |
| 2013/0088373 A1 * | 4/2013 | Takano | H03M 7/30 341/87 |
| 2013/0127980 A1 | 5/2013 | Haddick | |
| 2013/0179659 A1 * | 7/2013 | Seo | G06F 12/023 711/170 |
| 2013/0293121 A1 * | 11/2013 | Viacheslav | G09G 3/20 315/158 |
| 2013/0322517 A1 | 12/2013 | Zurpal | |

FOREIGN PATENT DOCUMENTS

| | | |
|---|---|---|
| CN | 1838772 A | 9/2006 |
| CN | 101035086 A | 9/2007 |
| CN | 101237301 A | 8/2008 |
| CN | 101355364 A | 1/2009 |
| CN | 101378384 A | 3/2009 |
| CN | 101553795 A | 10/2009 |
| CN | 101616318 A | 12/2009 |
| CN | 101669361 A | 3/2010 |
| CN | 101682745 A | 3/2010 |
| CN | 101426132 B | 7/2010 |
| CN | 101803382 A | 8/2010 |
| CN | 201758429 U | 3/2011 |
| CN | 101340575 B | 4/2012 |
| CN | 102939630 A | 2/2013 |

OTHER PUBLICATIONS

"International Search Report" mailed on Dec. 19, 2013 for International application No. PCT/CN2013/083653, International filing date: Sep. 17, 2013.

"International Search Report" mailed on Dec. 5, 2013 for International application No. PCT/CN2013/083061, International filing date: Sep. 6, 2013.

"International Search Report" mailed on Jan. 2, 2014 for International application No. PCT/CN2013/084496, International filing date: Sep. 27, 2013.

"International Search Report" mailed on Jan. 2, 2014 for International application No. PCT/CN2013/084489, International filing date: Sep. 27, 2013.

"International Search Report" mailed on Dec. 26, 2013 for International application No. PCT/CN2013/083739, International filing date: Sep. 18, 2013.

* cited by examiner

| Type of Algorithm | Complexity | Power | Ratio M | Compression Efficiency |
|---|---|---|---|---|
| Compression Algorithm 1 | 5 (Highest) | 5 (Highest) | 1/8 | 5 (Highest) |
| Compression Algorithm 2 | 4 | 4 | 1/4 | 4 |
| Compression Algorithm 3 | 3 | 3 | 1/4 | 3 |
| Compression Algorithm 4 | 2 | 2 | 1/2 | 2 |
| Compression Algorithm 5 | 1 (Lowest) | 1 (Lowest) | 1/2 | 1 (Lowest) |

FIG. 2

Side-by-side (A)

Row-interleaved (B)

Column-interleaved (C)

DATA PROCESSING APPARATUS WITH ADAPTIVE COMPRESSION ALGORITHM SELECTION FOR DATA COMMUNICATION BASED ON SENSOR INPUT/DISPLAY CONFIGURATION OVER DISPLAY INTERFACE AND RELATED DATA PROCESSING METHOD

CROSS REFERENCE TO RELATED APPLICATIONS

This application claims the benefit of U.S. provisional application No. 61/711,319 (filed on Oct. 9, 2012) and U.S. provisional application No. 61/712,949 (filed on Oct. 12, 2012). The entire contents of the related applications are incorporated herein by reference.

BACKGROUND

The disclosed embodiments of the present invention relate to transmitting and receiving display data over a display interface, and more particularly, to a data processing apparatus with adaptive compression algorithm selection based on a sensor input/display configuration for data communication over a display interface and related data processing method.

A display interface is disposed between a first chip and a second chip to transmit display data from the first chip to the second chip for further processing. For example, the first chip may be a host application processor, and the second chip may be a driver integrated circuit (IC). The display data may include image data, video data, graphic data, and/or OSD (on-screen display) data. Besides, the display data may be single view data for two-dimensional (2D) display or multiple view data for three-dimensional (3D) display. When a display panel supports a higher display resolution, 2D/3D display with higher resolution can be realized. Hence, the display data transmitted over the display interface would have a larger data size/data rate, which increases the power consumption of the display interface inevitably. If the host application processor and the driver IC are both located at a portable device (e.g., a smartphone) powered by a battery device, the battery life is shortened due to the increased power consumption of the display interface. Thus, there is a need for an innovative design which can effectively reduce the power consumption of the display interface.

SUMMARY

In accordance with exemplary embodiments of the present invention, a data processing apparatus with adaptive compression algorithm selection for data communication over a display interface and related data processing method are proposed.

According to a first aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream via a display interface. The compressor adaptively adjusts a compression algorithm applied to the input display data according to at least one sensor input signal.

According to a second aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream via a display interface. Contents carried by the output display data transmitted via the display interface are displayed on a display apparatus. The compressor adaptively adjusts a compression algorithm applied to the input display data according to a display configuration of the display apparatus.

According to a third aspect of the present invention, an exemplary data processing method is disclosed. The exemplary data processing method includes at least the following steps: receiving an input display data; adaptively adjusting a compression algorithm according to at least one sensor input signal; generating an output display data according to the input display data and the compression algorithm; and packing the output display data into an output bitstream, and outputting the output bitstream via a display interface.

According to a fourth aspect of the present invention, an exemplary data processing method is disclosed. The exemplary data processing method includes at least the following steps: receiving an input display data; adaptively adjusting a compression algorithm according to a display configuration of a display apparatus; generating an output display data according to the input display data and the compression algorithm; and packing the output display data into an output bitstream, and outputting the output bitstream via a display interface. Contents carried by the output display data transmitted via the display interface are displayed on the display apparatus.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a table showing characteristics of different compression algorithms supported by the compressor shown in FIG. 1.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a display data and then transmitting a compressed display data over a display interface. As the data size/data rate of the compressed display data is smaller than that of the original un-compressed display data, the power consumption of the display interface is reduced correspondingly. Besides, the present invention further proposes an adaptive compression scheme which is based on side information given by at least one auxiliary sensor and/or a display apparatus. This may allow the configuration of a compressor to be adjusted in a static or dynamic way according to the side information. In general, data compression is exploited to remove the information redundancy under a specific pixel size (i.e., a unit size of compression) and produce a compressed data constrained by a compression ratio. The compression ratio M may be defined as below.

$$M = \frac{\text{amount of compressed data}}{\text{amount of un-compressed data}}$$

In a case where the compression ratio is equal to 0.5 (i.e., M=1/2), the size of the compressed data is half of the size of the un-compressed data. As the compression performance is strongly related to some design factors such as the unit size of compression and the constrained compression ratio, the present invention therefore proposes using the adaptive compression scheme for enabling a compression algorithm selected from a plurality of candidate compression algorithms, where the selected compression algorithm most efficiently compresses the display data. Compared to a typical compression scheme using a fixed compression algorithm, the proposed adaptive compression scheme achieves better performance. Further details will be described as below.

Figure 1:
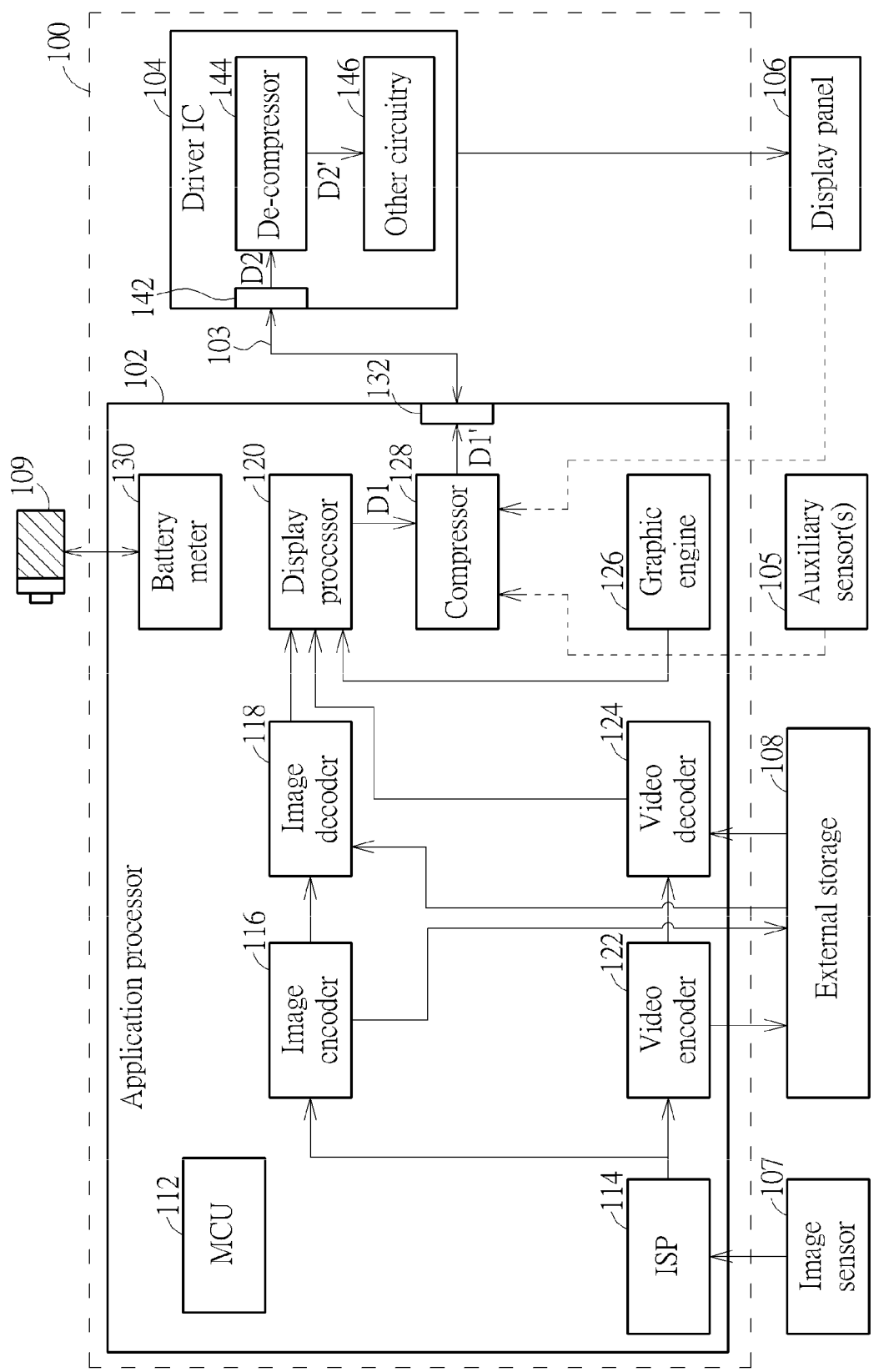
FIG. 1 is a block diagram illustrating a data processing system according to an embodiment of the present invention.

FIG. 1 is a block diagram illustrating a data processing system according to an embodiment of the present invention. The data processing system 100 includes a plurality of data processing apparatuses such as an application processor 102 and a driver integrated circuit (IC) 104. The application processor 102 and the driver IC 104 may be different chips, and the application processor 102 communicates with the driver IC 104 via a display interface 103. In this embodiment, the display interface 103 may be a display serial interface (DSI) standardized by a Mobile Industry Processor Interface (MIPI) or an embedded display port (eDP) standardized by a Video Electronics Standards Association (VESA).

The application processor 102 is coupled to the display interface 103, and supports un-compressed data transmission and compressed data transmission. When the application processor 102 is used to transmit un-compressed data to the driver IC 104 under a non-compression mode, the application processor 102 generates an un-compressed display data, and transmits the un-compressed display data over the display interface 103. When the application processor 102 is used to transmit compressed data to the driver IC 104 under a compression mode, the application processor 102 generates a compressed display data, and transmits the compressed display data over the display interface 103.

Regarding the driver IC 104, it is coupled to the display interface 103, and supports un-compressed data reception and compressed data reception. When the application processor 102 transmits the un-compressed data to the driver IC 104, the driver IC 104 is operated under a non-decompression mode to receive an un-compressed data from the display interface 103 and drive a display panel 106 according to the un-compressed display data. By way of example, the display panel 106 may be implemented using any 2D/3D display device (e.g. a retina display), and the pixel arrangement may be a rectangle layout, a triangle layout or a pentile layout. When the application processor 102 transmits the compressed data to the driver IC 104, the driver IC 104 is operated under a de-compression mode to receive a compressed display data from the display interface 103 and drive the display panel 106 according to a de-compressed display data derived from de-compressing the compressed display data. If there is no error introduced during the data transmission, the un-compressed data transmitted under the non-compression mode should be identical to the un-compressed data received under the non-decompression mode, and the compressed data transmitted under the compression mode should be identical to the compressed data received under the de-compression mode.

As shown in FIG. 1, the application processor 102 includes a micro control unit (MCU) 112, an image signal processor (ISP) 114, an image encoder 116, an image decoder 118, a display processor 120, a video encoder 122, a video decoder 124, a graphic engine 126, a compressor 128, a battery meter 130, and an output interface 132. The battery meter 130 is arranged to monitor the power status of a power source such as the battery capacity of a battery device 109. The MCU 112 serves as a display controller which controls the operation of the application processor 102. For example, the MCU 112 controls the application processor 102 to operate under the compression mode or the non-compression mode. Besides, the MCU 112 may program the compressor 128 to use a default compression algorithm. The ISP 114 is coupled to an image sensor 107, and serves as a backend processor for an image/video output of the image sensor 107. For example, the ISP 114 may be used to perform auto white balance (AWB), auto exposure (AE) and auto focus (AF). In a case where the image sensor 107 generates a single captured image to the ISP 114 under an image capturing mode, a processed image generated from the ISP 114 may be transmitted to the image encoder 116, and an encoded image is generated from the image encoder 116 to an external storage 108 such as a dynamic random access memory (DRAM). In another case where the image sensor 107 generates a video sequence composed of successive captured images to the ISP 114 under a video recording mode, a processed video generated from the ISP 114 may be transmitted to the video encoder 122, and an encoded video is generated from the video encoder 122 to the external storage 108.

The image decoder 118 receives an encoded image from the external storage 108, and generates a decoded image to the display processor 120. The video decoder 124 receives an encoded video from the external storage 108, and generates a decoded video to the display processor 120. However, it is possible that the single captured image/video sequence generated from the ISP 114 may be bypassed to the display processor 120 without additional encoding and decoding operations applied thereto. The graphic engine 126 is arranged to generate graphic data (e.g., a 3D graphic image) to the display processor 120.

The display processor 120 may generate an input display data D1 based on one or more of the image data, video data, text data (i.e., text-rich image data), graphic data, etc. In this embodiment, the display processor 120 may further perform image processing operations, including scaling, rotating, etc.

The compressor 128 is arranged to perform data compression upon the input display data D1 generated from the display processor 120, and accordingly generate an output display data D1', wherein the compressed display data (i.e., output display data D1') is packed/packetized into an output bitstream by the output interface 132 according to the transmission protocol of the display interface 103, and the output bitstream is transmitted to the driver IC 104 via the display interface 103.

The driver IC 104 includes an input interface 142, a de-compressor 144 and other circuitry 146. The input interface 142 receives an input bitstream from the display interface 103, and un-packs/un-packetizes the input bitstream into an input display data D2 which is a compressed display data when the application processor 102 is operated under a compression mode. In this embodiment, the de-compressor 132 is arranged to perform data de-compression upon the input display data D2, and accordingly generate a de-compressed display data D2'. The other circuitry 146 is arranged to drive the display panel 106 according to the de-compressed display data D2'.

As the present invention focuses on the adaptive compression scheme for configuring a compressor, further details directed to transmitting compressed/un-compressed display data from the application processor 102 to the driver IC 104 via the display interface 103 and driving the display panel 106 based on the compressed/un-compressed display data received from the display interface 103 are omitted here for brevity.

In this embodiment, the compressor 128 supports a plurality of compression algorithms having different compression characteristics. Please refer to FIG. 2, which is a table showing characteristics of different compression algorithms supported by the compressor 128 shown in FIG. 1. A compression algorithm represents a set of coding tools so as to remove the data redundancy on the input display data D1. The coding tools may be any kind of compression methods developed by proprietary algorithms or specified by state-of-the-art video standards (e.g., MPEG-1/2/4, H.261/262/263/264, and HEVC) or image standards (e.g., JPEG, JPEG-1s, JPEG-2000, JPEG-XR, PNG, and GIF). As shown in FIG. 2, these compression algorithms indicate different capability of compression performance in terms of compression ratio, compression efficiency, compression complexity, and power dissipation. Specifically, the compression efficiency is the ability of a compression algorithm to encode the input display data D1 at the lowest possible bit rate while maintaining a certain level of visual quality. There are two standard ways to measure the compression efficiency of a compression algorithm. One is to use an objective metric, such as a peak signal-to-noise ratio (PSNR). The other is to use a subjective assessment of video/image quality. If the compression efficiency of a compression algorithm is high, it means that the compression algorithm can preserve more input data information after compression is performed under a certain compression ratio. If the compression efficiency of a compression algorithm is low, it means that the compression algorithm will lose more input data information after compression is performed under a certain compression ratio. As a result, more compression artifacts may be introduced by a compression algorithm with lower compression efficiency. Hence, a high compression efficiency algorithm can preserve more input data information under a certain compression ratio, and the de-compressed display data can have better visual appearance and visual quality due to fewer compression artifacts.

In this embodiment, the compressor 128 is capable of adaptively adjusting a compression algorithm by referring to at least the side information shown as dotted lines in FIG. 1, where the side information may be provided by at least one auxiliary sensor 105 and the display panel 106. As the compressor 128 refers to the side information to select an adequate compression algorithm from supported compression algorithms having different compression characteristics, the compression performance can be optimized. For better understanding of technical features of the present invention, several embodiments are illustrated as below.

Figure 3:
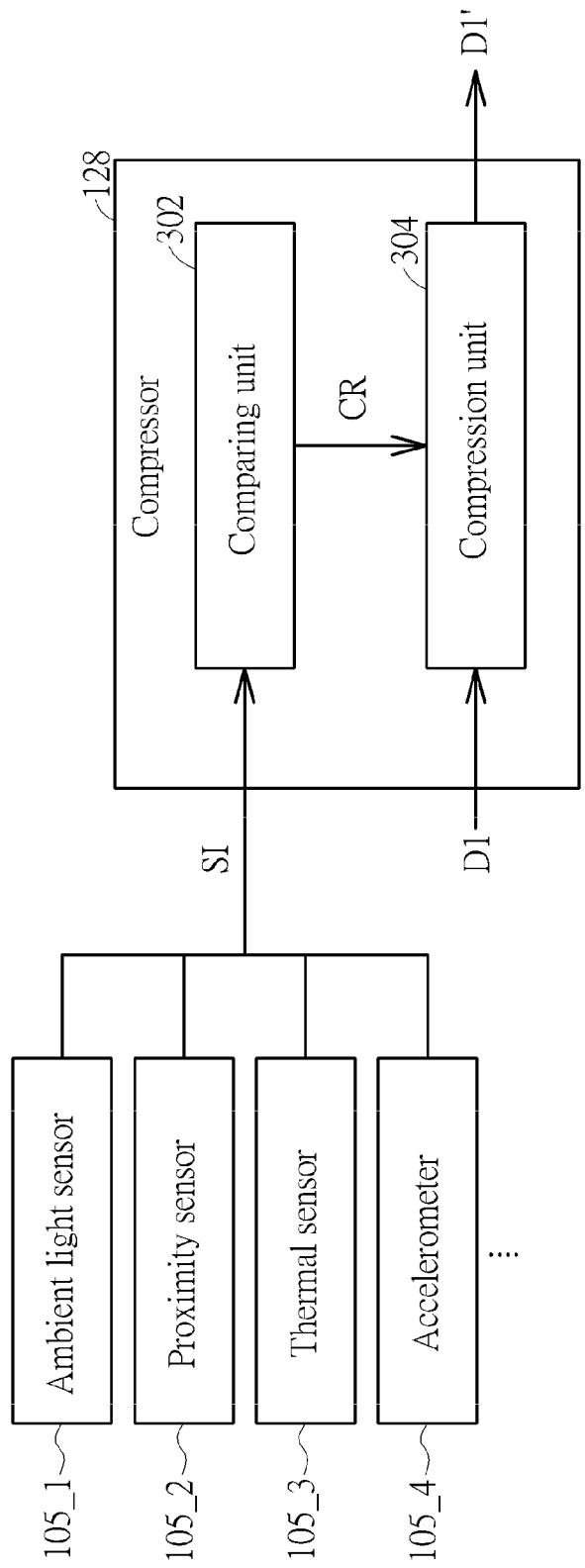
FIG. 3 is a diagram illustrating an embodiment of the compressor shown in FIG. 1.

In a first exemplary embodiment, the compressor 128 may adaptively adjust a compression algorithm applied to the input display data D1 according to at least one sensor input signal generated from the at least one auxiliary sensor 105. Please refer to FIG. 3, which is a diagram illustrating an embodiment of the compressor 128 shown in FIG. 1. As shown in FIG. 3, the compressor 128 includes a comparing unit 302 and a compression unit 304. The comparing unit 302 receives side information SI from at least one of a plurality of auxiliary sensors such as an ambient light sensor 105_1, a proximity sensor 105_2, a thermal sensor 105_3, and an accelerometer 105_4. Besides, the comparing unit 302 compares the side information SI with at least one predetermined threshold to generate a comparison result CR. The compression unit 304 is arranged for referring to the comparison result CR to adaptively adjust the compression algorithm employed. More specifically, the compression unit 304 supports a plurality of compression algorithms having different characteristics, and refers to the comparison result CR to select one of the supported compression algorithms for data compression.

In a first case where the ambient light sensor 105_1 generates a sensor input signal as the side information SI, the comparing unit 302 employs a predetermined threshold $THR_1$ to check the side information SI (i.e., ambient light strength). When the ambient light strength is high (i.e., the ambient light strength is higher than the predetermined threshold $THR_1$), the compression artifacts are hard to be seen by the end-user, and a compression algorithm with a more aggressive compression ratio (e.g., M=1/4, compared to 1/2) may be selected to save power. When the ambient light strength is low (i.e., the ambient light strength is not higher than the predetermined threshold $THR_1$), the compression artifacts are easier to be seen by the end-user, and a compression algorithm with a less aggressive compression ratio (e.g., M=3/4, compared to 1/2) may be selected to ensure the visual quality.

In a second case where the proximity sensor 105_2 generates a sensor input signal as the side information SI, the comparing unit 302 employs a predetermined threshold $THR_2$ to check the side information SI (i.e., a distance between the display panel 106 and an object (e.g., user's face)). When the distance is small (i.e., the distance is not larger than the predetermined threshold $THR_2$), the display panel 106 may be controlled to be black out or even powered down, and the compression algorithm employed by the compressor 128 is disabled such that no data compression is applied to the input display data D1. When the distance is large (i.e., the distance is larger than the predetermined threshold $THR_2$), the display panel 106 may be controlled to operate normally, and the compression algorithm employed by the compressor 128 is enabled such that data compression is applied to the input display data D1.

In a third case where the thermal sensor 105_3 generates a sensor input signal as the side information SI, the comparing unit 302 employs a predetermined threshold $THR_3$ to check the side information SI (i.e., temperature of an electronic device (e.g., a smartphone) in which the circuit elements shown in FIG. 1 are disposed). When the temperature is high (i.e., the temperature is higher than the predetermined threshold $THR_3$), a low power technique is crucial, and a less complex and lower power dissipation compression algorithm may be selected to save power and prevent the temperature from going higher. When the temperature is low (i.e., the temperature is not higher than the predetermined threshold $THR_3$), a more complex and higher power dissipation compression algorithm or a compression algorithm with a less aggressive compression ratio (e.g., M=3/4, compared to 1/2) may be selected to improve the visual quality.

In a fourth case where the accelerometer (or a G-sensor) 105_4 generates a sensor input signal as the side information SI, the comparing unit 302 employs a predetermined threshold $THR_4$ to check the side information SI (i.e., acceleration of an electronic device (e.g., a smartphone) in which the circuit elements shown in FIG. 1 are disposed). When the acceleration is high (i.e., the acceleration is higher than the predetermined threshold $THR_4$), the compression artifacts are hard to be seen by the end-user, and a compression algorithm with a more aggressive compression ratio (e.g., M=1/4, compared to 1/2) may be selected to save power. When the acceleration is low (i.e., the acceleration is not higher than the predetermined threshold $THR_4$), the compression artifacts are easier to be seen by the end-user, and a compression algorithm with a less aggressive compression ratio (e.g., M=3/4, compared to 1/2) may be selected to ensure the visual quality.

Figure 4:
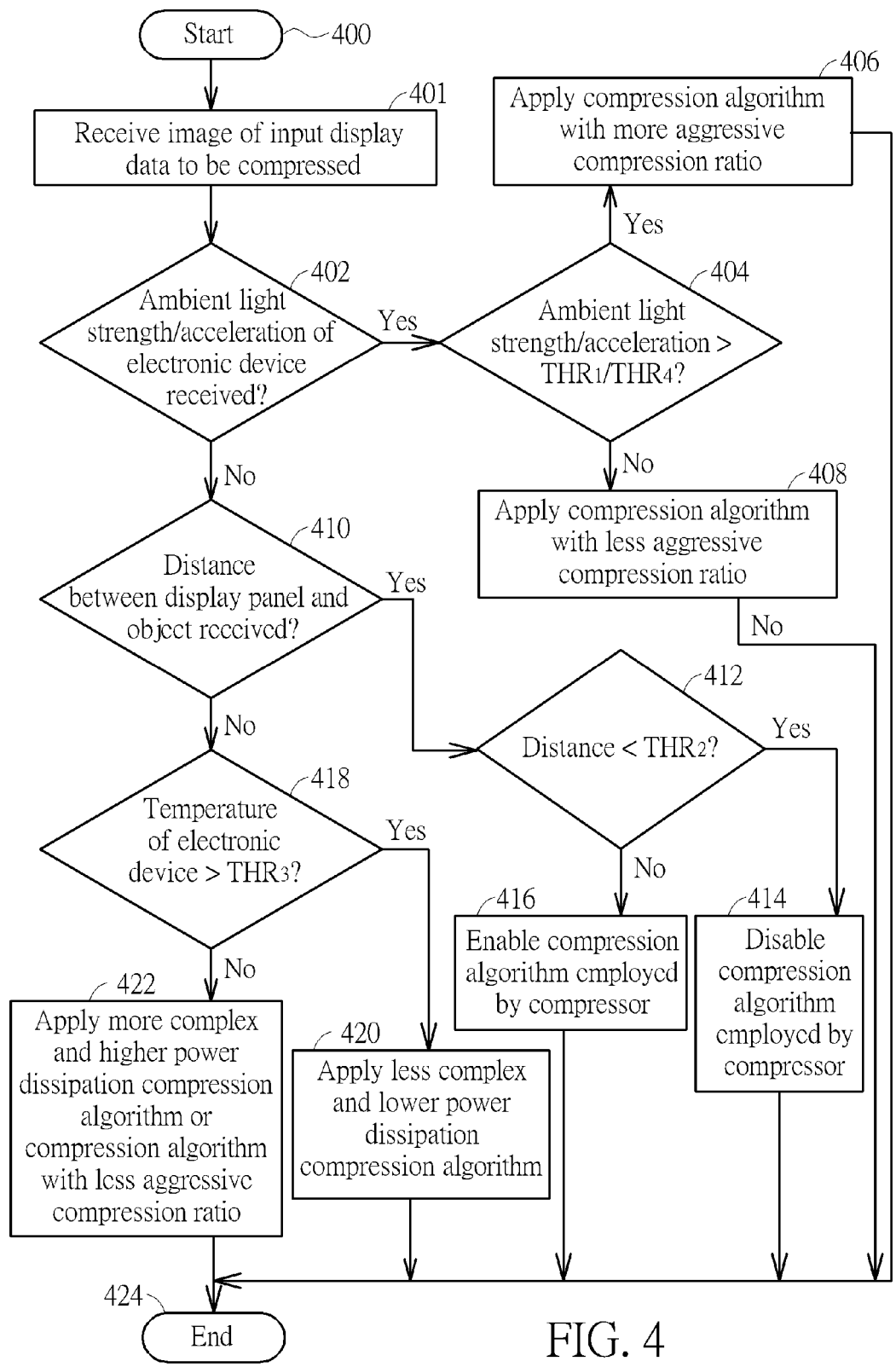
FIG. 4 is a flowchart illustrating an adaptive compression method based on at least one sensor input signal according to a first embodiment of the present invention.

FIG. 4 is a flowchart illustrating an adaptive compression method based on at least one sensor input signal according to a first embodiment of the present invention. The exemplary adaptive compression method may be briefly summarized by following steps.

Step 400: Start.

Step 401: Receive an image of the input display data D1 to be compressed.

Step 402: Check if the side information SI includes one of the ambient light strength and the acceleration of an electronic device (e.g., a smartphone). If yes, go to step 404; otherwise, go to step 410.

Step 404: Check if the ambient light strength/acceleration is higher than the predetermined threshold $THR_1$/$THR_4$. If yes, go to step 406; otherwise, go to step 408.

Step 406: Apply a compression algorithm with a more aggressive compression ratio to the image. Go to step 424.

Step 408: Apply a compression algorithm with a less aggressive compression ratio to the image. Go to step 424.

Step 410: Check if the side information SI includes the distance between the display panel 106 and an object (e.g., user's face). If yes, go to step 412; otherwise, go to step 418.

Step 412: Check if the distance is smaller than the predetermined threshold $THR_2$. If yes, go to step 414; otherwise, go to step 416.

Step 414: Disable a compression algorithm employed by the compressor 218 such that no data compression is applied to the image. Go to step 424.

Step 416: Enable a compression algorithm employed by the compressor 218 such that data compression is applied to the image. Go to step 424.

Step 418: Check if the temperature of the electronic device is higher than the predetermined threshold $THR_3$. If yes, go to step 420; otherwise, go to step 422.

Step 420: Apply a less complex and lower power dissipation compression algorithm to the image. Go to step 424.

Step 422: Apply a more complex and higher power dissipation compression algorithm or a compression algorithm with a less aggressive compression ratio to the image.

Step 424: End.

Provided that the result is substantially the same, the steps are not required to be executed in the exact order shown in FIG. 4. For example, the order of steps 402, 410 and 418 may be changed, depending upon actual design consideration. The same objective of adaptively selecting the compression algorithm is achieved.

It should be noted that steps 402, 404, 410, 412, 418 are performed by the comparing unit 302, and steps 401, 406, 408, 414, 416, 420, 422 are performed by the compression unit 304. As a person skilled in the art can readily understand details of each step shown in FIG. 4 after reading above paragraphs, further description is omitted here for brevity.

Figure 5:
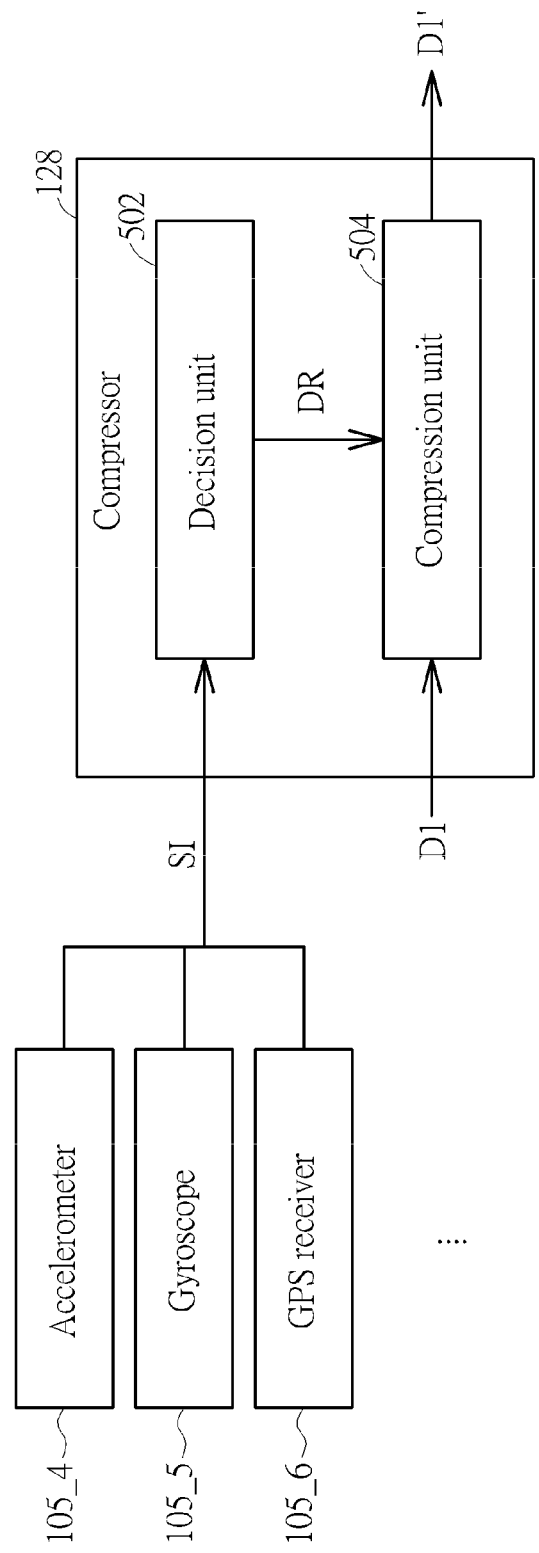
FIG. 5 is a diagram illustrating another embodiment of the compressor shown in FIG. 1.

Please refer to FIG. 5, which is a diagram illustrating another embodiment of the compressor 128 shown in FIG. 1. As shown in FIG. 5, the compressor 128 includes a decision unit 502 and a compression unit 504. The decision unit 502 receives side information SI from at least one of a plurality of auxiliary sensors such as the accelerometer 105_4, a gyroscope 105_5, and a receiver of a global navigation satellite system such as a global positioning system (GPS) receiver 105_6. Besides, the decision unit 502 checks the side information SI to generate a decision result DR. The compression unit 504 is arranged for referring to the decision result DR to adaptively adjust the compression algorithm employed. More specifically, the compression unit 504 supports a plurality of compression algorithms having different characteristics, and refers to the decision result DR to select one of the supported compression algorithms for data compression.

In a first case where the gyroscope 105_5 generate a sensor input signal as the side information SI, the decision unit 502 refers to the orientation measured/estimated by the gyroscope 105_5 based on angular momentum to determine the decision result DR. If the gyroscope 105_5 detects that an electronic device (e.g., a smartphone) in which the circuit elements shown in FIG. 1 are disposed is moving horizontally, the decision result DR indicates that a compression algorithm with horizontal prediction between horizontal pixels should be preferably selected. If the gyroscope 105_5 detects that the electronic device is moving vertically, the decision result DR indicates that a compression algorithm with vertical prediction between vertical pixels should be preferably selected. If the gyroscope 105_5 detects that the electronic device is moving horizontally and vertically, the decision result DR indicates that a compression algorithm with prediction along the moving direction should be preferably selected.

In a second case where the gyroscope 105_5 and the accelerometer 105_4 generate sensor input signals as the side information SI, the decision unit 502 obtains a view angle based on the acceleration information provided from the accelerometer 105_4 and the orientation information provided from the gyroscope 105_5, and determines the decision result DR by comparing the view angle with a predetermined range (i.e., a normal view range of the display panel 106). If the view angle is within the normal view range, the compression artifacts are easier to be seen by the end-user, and a compression algorithm with a less aggressive compression ratio (e.g., M=3/4, compared to 1/2) may be selected to ensure the visual quality. When the view angle is out of the normal view range, the compression artifacts are hard to be seen by the end-user, and a compression algorithm with a more aggressive compression ratio (e.g., M=1/4, compared to 1/2) may be selected to save power.

In a third case where the GPS receiver 105_6 generates a sensor input signal as the side information SI, the decision unit 502 refers to the location and/or time information provided by a space-based satellite navigation system to determine the decision result DR. In one embodiment, the decision result DR may instruct the compression unit 504 to select among different compression algorithms with different compression ratios according to the location of an electronic device (e.g., a smartphone) in which the circuit elements shown in FIG. 1 are disposed. For example, a user may prefer higher display quality at home and prefer lower power consumption in the office. The compression unit 504 therefore refers to the decision result DR to select an appropriate compression algorithm to meet user's requirement/preference. More specifically, if the location indicated by the GPS receiver 105_6 has a coordinate of user's home, a compression algorithm with a less aggressive compression ratio (e.g., M=3/4, compared to 1/2) may be selected to ensure the visual quality; and if the location indicated by the GPS receiver 105_6 has a coordinate of user's office, a compression algorithm with a more aggressive compression ratio (e.g., M=1/4, compared to 1/2) may be selected to save power.

Figure 6:
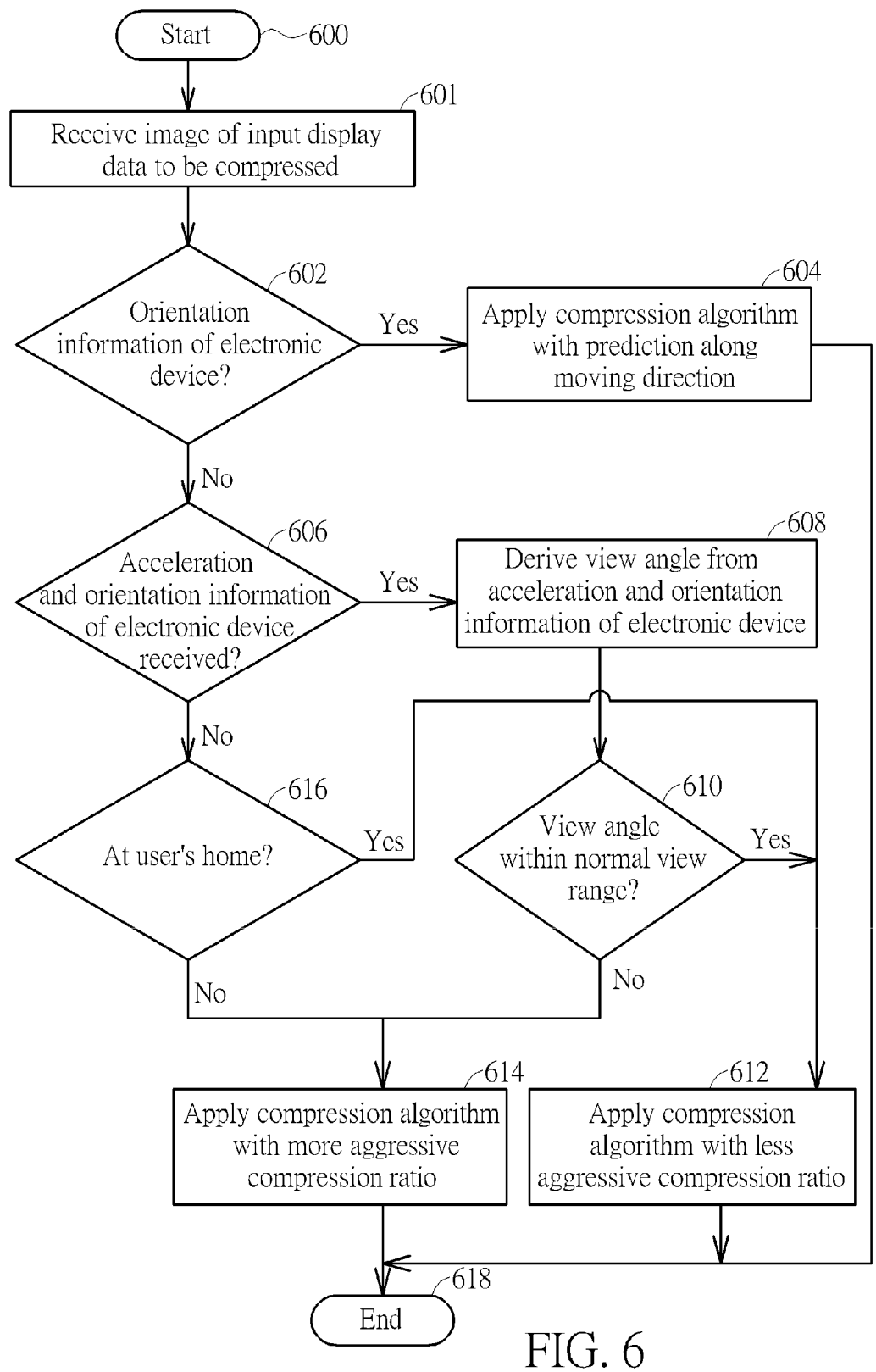
FIG. 6 is a flowchart illustrating an adaptive compression method based on at least one sensor input signal according to a second embodiment of the present invention.

FIG. 6 is a flowchart illustrating an adaptive compression method based on at least one sensor input signal according to a second embodiment of the present invention. The exemplary adaptive compression method may be briefly summarized by following steps.

Step 600: Start.

Step 601: Receive an image of the input display data D1 to be compressed.

Step 602: Check if the side information SI includes orientation information of an electronic device (e.g., a smartphone). If yes, go to step 604; otherwise, go to step 606.

Step 604: Apply a compression algorithm with prediction along the moving direction. Go to step 618.

Step 606: Check if the side information SI includes acceleration and orientation information of an electronic device (e.g., a smartphone). If yes, go to step 608; otherwise, go to step 616.

Step 608: Derive a view angle from acceleration and orientation information of the electronic device.

Step 610: Check if the view angle is within a normal view range of the display panel 106. If yes, go to step 612; otherwise, go to step 614:

Step 612: Apply a compression algorithm with a less aggressive compression ratio. Go to step 618.

Step 614: Apply a compression algorithm with a more aggressive compression ratio. Go to step 618.

Step 616: Check if the location of the electronic device has the coordinate of user's home. If yes, go to step 612; otherwise (e.g., the location of the electronic device has the coordinate of user's office), go to step 614.

Step 618: End.

Provided that the result is substantially the same, the steps are not required to be executed in the exact order shown in FIG. 6. For example, the order of steps 602, 606, 616 may be changed, depending upon actual design consideration. The same objective of adaptively selecting the compression algorithm is achieved.

It should be noted that steps 602, 606, 608, 610, 616 are performed by the decision unit 502, and steps 601, 604, 612, 614 are performed by the compression unit 504. As a person skilled in the art can readily understand details of each step shown in FIG. 6 after reading above paragraphs, further description is omitted here for brevity.

Figure 7:
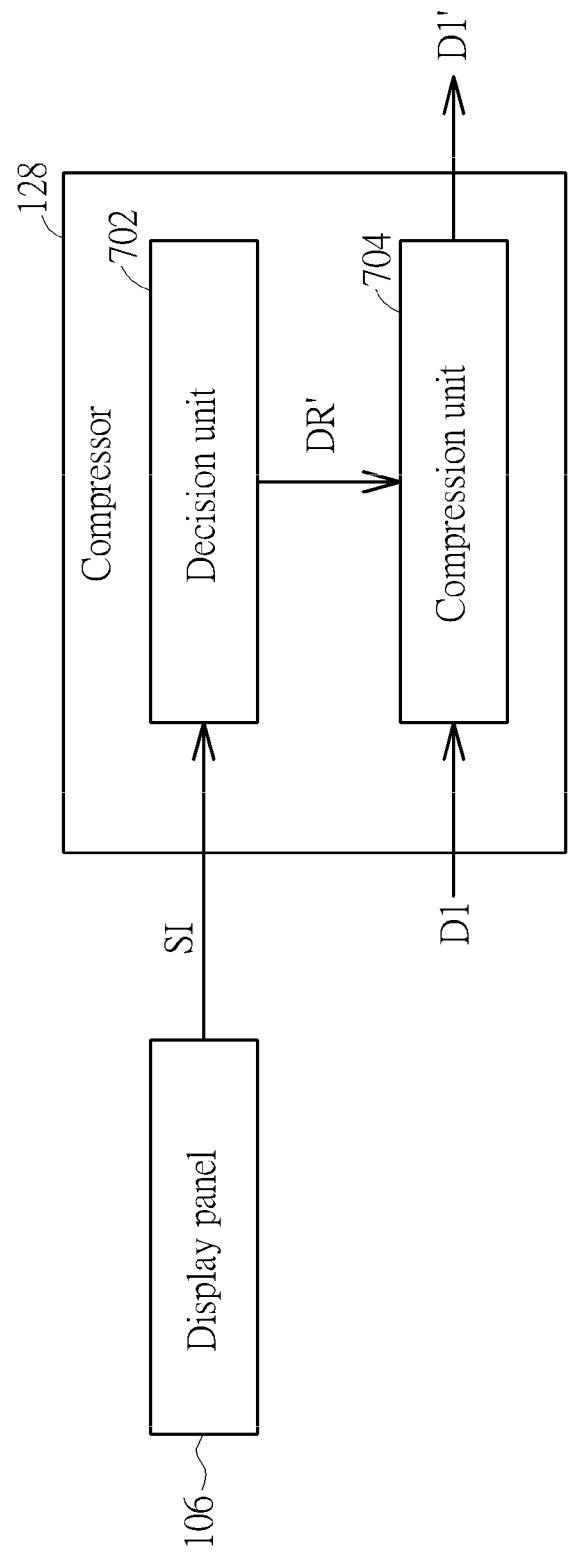
FIG. 7 is a diagram illustrating yet another embodiment of the compressor shown in FIG. 1.

In a second exemplary embodiment, the compressor 128 may adaptively adjust a compression algorithm applied to the input display data D1 according to a display configuration of a display apparatus (e.g., display panel 106). Please refer to FIG. 7, which is a diagram illustrating yet another embodiment of the compressor 128 shown in FIG. 1. The compressor 128 includes a decision unit 702 and a compression unit 704. The decision unit 702 may receive side information SI from the display panel 106, and determine a decision result DR' based on the display configuration indicated by the side information SI. The compression unit 704 supports a plurality of compression algorithms having different characteristics, and refers to the decision result DR' to select one of the supported compression algorithms for data compression.

Figure 8:
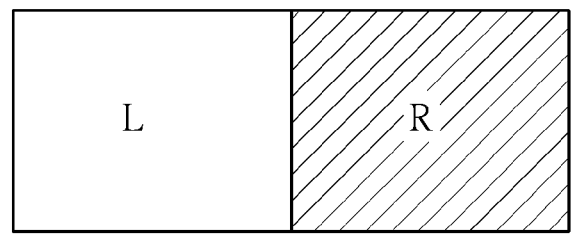
FIG. 8 is a diagram illustrating different 3D display formats.
Figure 8:
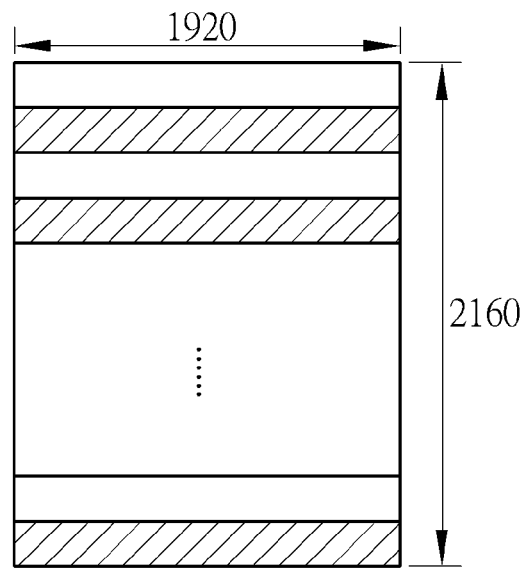
Figure 8:
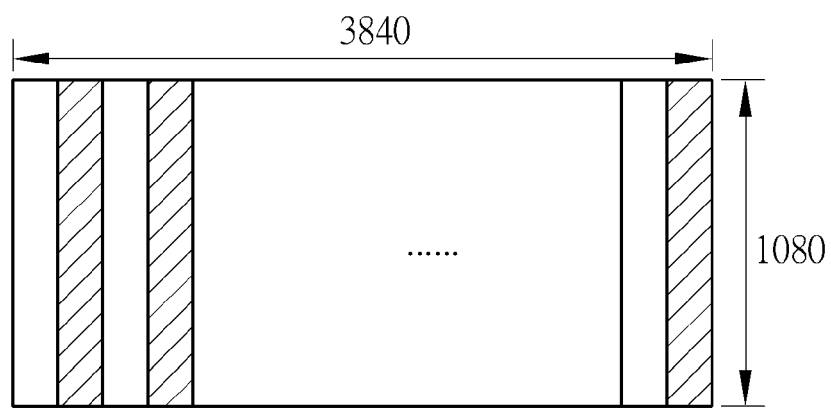

In one exemplary design, the display panel 106 may support a plurality of different three-dimensional (3D) display formats, such as a side-by-side format, a row-interleaved format and a column-interleaved format as shown in FIG. 8. When the decision unit 702 checks the side information SI to know that the side-by-side format is employed by the display panel 106, the decision result DR' instructs the compression unit 704 to preferably select the compression algorithm $N_1$ since the compression algorithm $N_1$ is particularly designed to extract the left-view pixel information and the right-view pixel information of the 3D content arranged in the side-by-side format. In this way, the optimized compression efficiency for the input display data D1 in the side-by-side format is achieved. Similarly, when the decision unit 702 checks the side information SI to know that the row-interleaved format is employed by the display panel 106, the decision result DR' instructs the compression unit 704 to preferably select the compression algorithm $N_2$ particularly designed to extract the left-view pixel information and the right-view pixel information of the 3D content arranged in the row-interleaved format; and when the decision unit 702 checks the side information SI to know that the column-interleaved format is employed by the display panel 106, the decision result DR' instructs the compression unit 704 to preferably select the compression algorithm $N_3$ particularly designed to extract the left-view pixel information and the right-view pixel information of the 3D content arranged in the column-interleaved format. To put it simply, the compressor 218 is arranged to employ a first compression algorithm for data compression when the display configuration indicates a first 3D display format, and employ a second compression algorithm for data compression when the display configuration indicates a second 3D display format different from the first 3D format.

Figure 9:
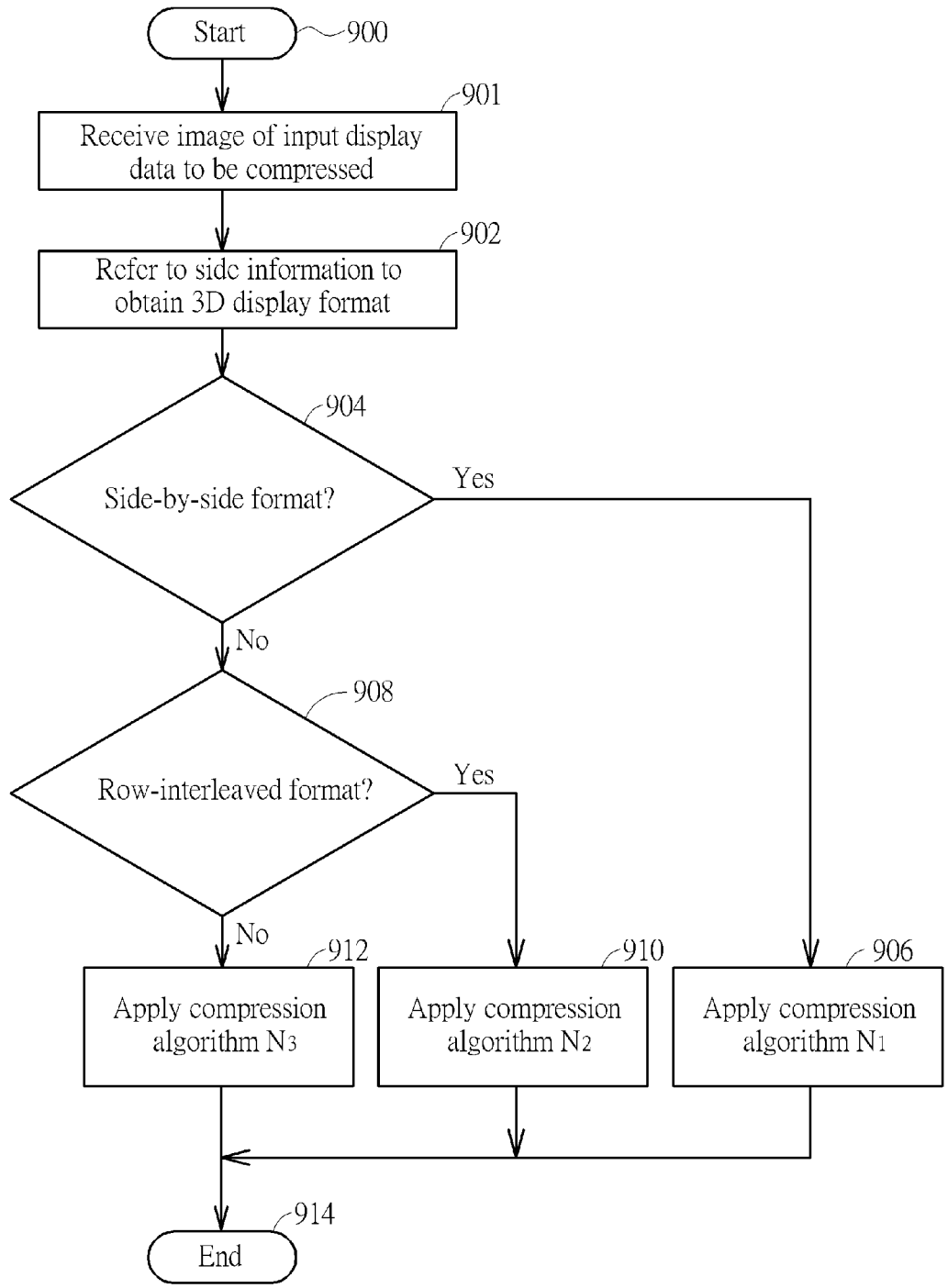
FIG. 9 is a flowchart illustrating an adaptive compression method based on a display configuration of a display apparatus according to a first embodiment of the present invention.

FIG. 9 is a flowchart illustrating an adaptive compression method based on a display configuration of a display apparatus according to a first embodiment of the present invention. The exemplary adaptive compression method may be briefly summarized by following steps.

Step 900: Start.

Step 901: Receive an image of the input display data D1 to be compressed.

Step 902: Refer to side information SI to obtain the 3D display format.

Step 904: Check if the 3D display format is a side-by-side format. If yes, go to step 906; otherwise, go to step 908.

Step 906: Apply the compression algorithm $N_1$ to the image. Go to step 914.

Step 908: Check if the 3D display format is a row-interleaved format. If yes, go to step 910; otherwise, go to step 912.

Step 910: Apply the compression algorithm $N_2$ to the image. Go to step 914.

Step 912: Apply the compression algorithm $N_3$ to the image.

Step 914: End.

Provided that the result is substantially the same, the steps are not required to be executed in the exact order shown in FIG. 9. For example, the order of steps 904 and 908 may be changed, depending upon actual design consideration. The same objective of adaptively selecting the compression algorithm is achieved.

It should be noted that steps 902, 904, 908 are performed by the decision unit 702, and steps 901, 906, 910, 912 are performed by the compression unit 704. As a person skilled in the art can readily understand details of each step shown in FIG. 9 after reading above paragraphs, further description is omitted here for brevity.

The display panel 106 may support a two-dimensional (2D) display mode and a 3D display mode. Thus, when the display data carries the 2D content, the display panel 106 is operated under the 2D display mode; and when the display data carries the 3D content, the display panel 106 is operated under the 3D display mode. The decision unit 720 therefore refers to the side information SI to determine whether the display panel 106 acts as a 2D panel or a 3D panel. When the decision unit 702 determines that the 3D display mode is employed by the display panel 106, the decision result DR' instructs the compression unit 704 to preferably select the compression algorithm $N_1$ since the compression algorithm $N_1$ is particularly designed for applying data compression to the input display data D1 arranged in the 3D format; and when the decision unit 702 determines that the 2D display mode is employed by the display panel 106, the decision result DR' instructs the compression unit 704 to preferably select the compression algorithm $N_2$ since the compression algorithm $N_2$ is particularly designed for applying data compression to the input display data D1 arranged in the 2D format.

Figure 10:
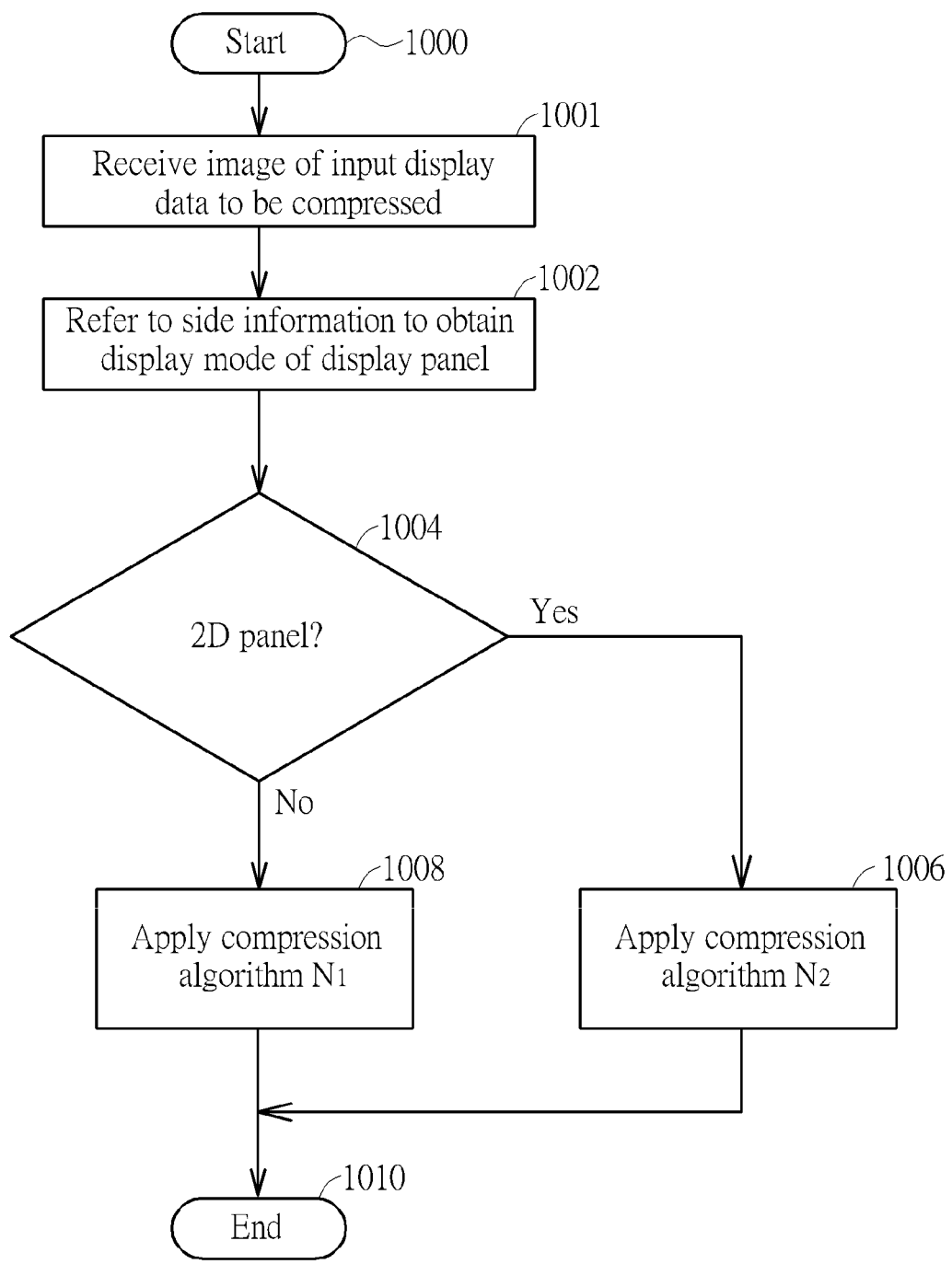
FIG. 10 is a flowchart illustrating an adaptive compression method based on a display configuration of a display apparatus according to a second embodiment of the present invention.

FIG. 10 is a flowchart illustrating an adaptive compression method based on a display configuration of a display apparatus according to a second embodiment of the present invention. Provided that the result is substantially the same, the steps are not required to be executed in the exact order shown in FIG. 10. The exemplary adaptive compression method may be briefly summarized by following steps.

Step 1000: Start.

Step 1001: Receive an image of the input display data D1 to be compressed.

Step 1002: Refer to side information SI to obtain the display mode of the display panel 106.

Step 1004: Does the display panel 106 act as a 2D panel? If yes, go to step 1006; otherwise, go to step 1008.

Step 1006: Apply the compression algorithm $N_2$ to the image. Go to step 1010.

Step 1008: Apply the compression algorithm $N_1$ to the image.

Step 1010: End.

It should be noted that steps 1002, 1004 are performed by the decision unit 702, and steps 1001, 1006, 1008 are performed by the compression unit 704. As a person skilled in the art can readily understand details of each step shown in FIG. 10 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing apparatus comprising: a compressor, arranged for receiving an input a first display data and generating an output a second display data according to the first display data;

and an output interface, arranged for packing the second display data into an output bitstream, and outputting the output bitstream via a display interface;

wherein the compressor adaptively adjusts a compression algorithm applied to the first display data according to at least one sensor input signal that is generated from at least one of an ambient light sensor, a thermal sensor, an accelerometer, a gyroscope, and a receiver of a global navigation satellite system;

the compressor is arranged to employ a first compression algorithm as the compression algorithm when the at least one sensor input signal indicates a first value, and employ a second compression algorithm as the compression algorithm when the at least one sensor input signal indicates a second value different from the first value, where the second compression algorithm is different from the first compression algorithm.

2. The data processing apparatus of claim 1, wherein the display interface is a display serial interface (DSI) standardized by a Mobile Industry Processor Interface (MIPI) or an embedded display port (eDP) standardized by a Video Electronics Standards Association (VESA).

3. The data processing apparatus of claim 1, wherein the at least one sensor input signal is generated from the ambient light sensor;

and the compressor is arranged to employ the first compression algorithm as the compression algorithm when the at least one sensor input signal indicates that an ambient light strength is higher than a predetermined threshold, and employ the second compression algorithm as the compression algorithm when the at least one sensor input signal indicates that the ambient light strength is not higher than the predetermined threshold.

4. The data processing apparatus of claim 3, wherein the first compression algorithm has a more aggressive compression ratio than the second compression algorithm.

5. A data processing apparatus comprising: a compressor, arranged for receiving a first display data and generating a second display data according to the first display data;

and an output interface, arranged for packing the second display data into an output bitstream, and outputting the output bitstream via a display interface;
wherein the compressor adaptively adjusts a compression algorithm applied to the first display data according to at least one sensor input signal that is generated from a proximity sensor;
the compressor is arranged to enable the compression algorithm when the at least one sensor input signal indicates that a
distance is larger than a predetermined threshold, and disable the compression algorithm when the at least one sensor input signal indicates that the distance is not larger than the predetermined threshold;
when the compression algorithm is enabled based on the distance, the compressor applies data compression to the first display data, and when the compression algorithm is disabled based on the distance, the compressor does not apply data compression to the first display data.

6. The data processing apparatus of claim 1, wherein the at least one sensor input signal is generated from the thermal sensor;
and the compressor is arranged to employ the first compression algorithm as the compression algorithm when the at least one sensor input signal indicates that a temperature is higher than a predetermined threshold, and employ the second compression algorithm as the compression algorithm when the at least one sensor input signal indicates that the temperature is not higher than the predetermined threshold.

7. The data processing apparatus of claim 6, wherein the first compression algorithm is less complex than the second compression algorithm.

8. The data processing apparatus of claim 1, wherein the at least one sensor input signal is generated from the accelerometer;
and the compressor is arranged to employ the first compression algorithm as the compression algorithm when the at least one sensor input signal indicates that acceleration is higher than a predetermined threshold, and employ the second compression algorithm as the compression algorithm when the at least one sensor input signal indicates that the acceleration is not higher than the predetermined threshold.

9. The data processing apparatus of claim 8, wherein the first compression algorithm has a more aggressive compression ratio than the second compression algorithm.

10. The data processing apparatus of claim 1, wherein the at least one sensor input signal is generated from the gyroscope;
and the compressor is arranged to employ the first compression algorithm as the compression algorithm when the at least one sensor input signal indicates a first moving direction, and employ the second compression algorithm as the compression algorithm when the at least one sensor input signal indicates that a second moving direction different from the first moving direction, where the first compression algorithm is configured to perform prediction along the first moving direction, and the second compression algorithm is configured to perform prediction along the second moving direction.

11. The data processing apparatus of claim 1, wherein the at least one sensor input signal includes sensor input signals generated from the accelerometer and the gyroscope;
and the compressor is arranged to employ the first compression algorithm as the compression algorithm when the at
least one sensor input signal indicates that a view angle is within a predetermined range, and employ the second compression algorithm as the compression algorithm when the at least one sensor input signal indicates that view angle is out of the predetermined range.

12. The data processing apparatus of claim 11, wherein the second compression algorithm has a more aggressive compression ratio than the first compression algorithm.

13. The data processing apparatus of claim 1, wherein the at least one sensor input signal is generated from a receiver of a global navigation satellite system; the compressor is arranged to employ a first compression algorithm as the compression algorithm when the at least one sensor input signal indicates that a location of the data processing apparatus has a coordinate associated with a first place, and employ a second compression algorithm as the compression algorithm when the at least one sensor input signal indicates that the location of the data processing apparatus has a coordinate associated with a second place, where the second compression algorithm is different from the first compression algorithm.

14. A data processing method comprising: receiving a first display data; adaptively adjusting a compression algorithm according to at least one sensor input signal;
utilizing a compressor for generating a second display data according to the first display data and the compression algorithm;
and packing the second display data into an output bitstream, and outputting the output bitstream via a display interface; wherein the at least one sensor input signal is generated from at least one of an ambient light sensor, a thermal sensor, an accelerometer, a gyroscope, and a receiver of a global navigation satellite system;
the compressor employs a first compression algorithm as the compression algorithm when the at least one sensor input signal indicates a first value, and employs a second compression algorithm as the compression algorithm when the at least one sensor input signal indicates a second value different from the first value, where the second compression algorithm is different from the first compression algorithm.

15. The data processing method of claim 14, wherein the display interface is a display serial interface (DSI) standardized by a Mobile Industry Processor Interface (MIPI) or an embedded display port (eDP) standardized by a Video Electronics Standards Association (VESA).

16. A data processing method comprising: receiving a first display data; adaptively adjusting a compression algorithm according to at least one sensor input signal;
utilizing a compressor for generating a second display data according to the first display data and the compression algorithm; and packing the second display data into an output bitstream, and outputting the output bitstream via a display interface;
wherein the at least one sensor input signal is generated from a proximity sensor;
the compressor enables the compression algorithm when the at least one sensor input signal indicates that a distance is larger than a predetermined threshold, and disables the compression algorithm when the at least one sensor input signal indicates that the distance is not larger than the predetermined threshold;

when the compression algorithm is enabled based on the distance, the compressor applies data compression to the first display data, and when the compression algorithm is disabled based on the distance, the compressor does not apply data compression to the first display data.

* * * * *